US009049011B1

(12) United States Patent
Agrawal

(10) Patent No.: US 9,049,011 B1
(45) Date of Patent: Jun. 2, 2015

(54) SECURE KEY STORAGE AND DISTRIBUTION

(71) Applicant: Washington State University Research Foundation, Pullman, WA (US)

(72) Inventor: Punit Agrawal, Seattle, WA (US)

(73) Assignee: Washington State University, Pullman, WA (US)

( * ) Notice: Subject to any disclaimer, the term of this patent is extended or adjusted under 35 U.S.C. 154(b) by 10 days.

(21) Appl. No.: 13/967,029

(22) Filed: Aug. 14, 2013

Related U.S. Application Data

(60) Provisional application No. 61/683,624, filed on Aug. 15, 2012.

(51) Int. Cl.
*H04L 29/00* (2006.01)
*H04L 9/08* (2006.01)

(52) U.S. Cl.
CPC .............. *H04L 9/085* (2013.01); *H04L 9/0888* (2013.01)

(58) Field of Classification Search
CPC .............................. H04L 9/085; H04L 9/0888
USPC .......................................... 713/171; 380/287
See application file for complete search history.

(56) References Cited

U.S. PATENT DOCUMENTS

| 8,245,050 B1* | 8/2012 | Subramanian et al. ....... 713/183 |
| 2002/0067832 A1* | 6/2002 | Jablon .......................... 380/277 |
| 2010/0202609 A1* | 8/2010 | Sandhu et al. ................... 380/44 |
| 2011/0099379 A1* | 4/2011 | Ganesan et al. ............... 713/175 |
| 2013/0039491 A1* | 2/2013 | Unagami et al. ................ 380/44 |

OTHER PUBLICATIONS

Sharma et al., "Key Generation Protocol in IBC," International Journal of Network Security, vol. 15, No. 5, Sep. 2013, pp. 341-349.*
Jablon, David, "Password Authentication Using Multiple Servers," CT-RSA 2001, LNCS 2020, 2001, pp. 344-360.*
Jakobsson, Markus et al., "Addition of ElGamal Plaintexts," ASIACRYPT2000, LNCS 1976, 2000, pp. 346-358.*
Desmedt, Yvo et al., "Shared generation of authenticators and signatures," Advances in Cryptology—CRYPTO '91, LNCS 576, 1992, pp. 457-469.*
Chakravarthy, R., Hauser, C., and Bakken, D.E., "Long-lived authentication protocols for process control systems", International Journal of Critical Infrastructure Protection 3, (2010), 174-181, vol. 3-Iss. 4.
Desmedt, Y., "Some Recent Research Aspects of Threshold Cryptography". Proceedings of the First International Workshop on Information Security, (1998), 158-173, Springer-Verlag.

(Continued)

*Primary Examiner* — Michael Pyzocha
(74) *Attorney, Agent, or Firm* — Athorus, PLLC

(57) ABSTRACT

This disclosure describes a distributed, fault-tolerant security system that enables the secure storage and distribution of private keys. In one implementation, the security system includes a plurality of computing resources that independently store private keys provided by publishers and encrypted using a single security system public key. To protect against malicious activity, the security system private key necessary to decrypt the publication private keys is not stored at any of the computing resources. Rather portions, or shares of the security system private key are stored at each of the computing resources within the security system and multiple security systems must communicate and share partial decryptions in order to decrypt the stored private key.

20 Claims, 10 Drawing Sheets

(56) References Cited

OTHER PUBLICATIONS

Desmedt, Y.G. "Threshold cryptography". European Transactions on Telecommunications, (1994), 449-458, vol. 5-Iss. 4.
Fischer, M. and Lynch, N., "Impossibility of distributed consensus with one faulty process". Journal of the ACM (JACM) (1985), 374-382, vol. 32-Iss. 2.
Herzberg, A., Jarecki, S., Krawczyk, H., and Yung, M. "Proactive Secret Sharing Or: How to Cope With Perpetual Leakage". Proceedings of the 15th Annual International Cryptology Conference on Advances in Cryptology, (1995), 339-352, Springer-Verlag.
Katz, J. "Efficient and non-malleable proofs of plaintext knowledge and applications" Proceedings of the 22nd international conference on Theory and applications of cryptographic techniques, (2003), 211-228, Springer-Verlag.
Lamport, L., Shostak, R., and Pease, M. "The Byzantine Generals Problem". ACM Transactions on Programming Languages and Systems (TOPLAS). (1982), 382-401, vol. 4-Iss. 3.
Malkhi, D. and Reiter, M. "Byzantine Quorum Systems". Distributed Computing, (1998), 203-213, vol. 11-Iss. 4.
Marsh, M. and Schneider, F. "CODEX: A robust and secure secret distribution system". IEEE Transactions on Dependable and Secure Computing, (2004), 34-47, vol. 1-Iss. 1.
Rodrigues, R. and Liskov, B. "Byzantine Fault Tolerance in Long-Lived Systems." 2nd Bertinoro Workshop on Future Directions in Distributed Computing (FuDiCo II), (2004) Bertinoro, Italy.
Shamir, A. "How to share a secret". Communications of the ACM (1979), 612-613, vol. 22, Iss.11.

Shoup, V. "Practical threshold signatures". Proceedings of the 19th international conference on Theory and application of cryptographic techniques, (2000), 207-220, Springer-Verlag.
Sousa, P., Neves, N. F., and Verissimo, P. "Hidden problems of asynchronous proactive recovery". Proceedings of the 3rd workshop on on Hot Topics in System Dependability, (2007) USENIX Association.
Sousa, P., Neves, N. F., and Verissimo, P. "A New Approach to Proactive Recovery". Fifth European Dependable Computing Conference (EDCC-5), (2005), 35-40, Supplementary Volume.
Sousa, P., Neves, N. F., and Verissimo, P. "Proactive resilience revisited: The delicate balance between resisting intrusions and remaining available". In Proc. of the Symp. on Reliable Distributed Systems, IEEE Computer Society (2006), 71-80.
Wylie, J.J., Bigrigg, M.W., Strunk, J.D., Ganger, G.R., Kiliççöte, H., and Khosla, P.K. "Survivable Information Storage Systems". Computer, (2000), 61-68, vol. 33-Iss. 8.
Zhou, L., Schneider, F.B., and Van Renesse, R. "COCA: A secure distributed online certification authority". ACM Transactions on Computer Systems, (2002), 329-368, vol. 20, Iss. 4.
Zhou, L., Schneider, F.B., and Van Renesse, R. "APSS: Proactive secret sharing in asynchronous systems". ACM Transactions on Information and System Security (TISSEC),(2005), 259-286, vol. 8-Iss. 3.
Sousa, P. "How Resilient are Distributed f Fault/Intrusion-Tolerant Systems?" Proceedings of the 2005 International Conference on Dependable Systems and Networks, IEEE Computer Society (2005), 98-107.

* cited by examiner

US 9,049,011 B1

SECURE KEY STORAGE AND DISTRIBUTION

CROSS-REFERENCE TO RELATED APPLICATIONS

This application claims the benefit of U.S. Provisional Application No. 61/683,624, filed Aug. 15, 2012 entitled "Secure Key Storage And Distribution," which is incorporated herein by reference in its entirety.

STATEMENT REGARDING FEDERALLY-SPONSORED RESEARCH

This invention was made with government support under DE-OE0000097 (TCIPG) awarded by the Department of Energy. The government has certain rights in the invention.

BACKGROUND

Secure storage and transmission of data has become a critical component of data communication. Individuals, businesses, corporations, governments, etc. rely on digital information to conduct daily business and even to communicate with others. Often, mission critical information is stored and/or transmitted on unsecure networks and entities need to ensure that unauthorized individuals do not obtain access to that data. As a result of these increasing security needs, many forms of data encryption have been developed. Encryption is a cryptographic process to transform plaintext into ciphertext, based on an encryption algorithm key. The plaintext can be deduced using a decryption algorithm and the same or corresponding key. Generally, there are two classes of cryptographic algorithms: symmetric key cryptography and asymmetric key cryptography. Symmetric key cryptography uses the same key for both encryption and decryption. Asymmetric key cryptography utilizes different keys for encryption and decryption. The key used for encryption is commonly referred to as a "public key," while the key for decryption is commonly referred to as a "private key." The public key is made available to anyone that wants to encrypt data for delivery to a specific individual. The private key is not made public and used to decrypt the data encrypted with the public key.

Even with the various cryptography solutions, current systems do not allow for a distributed, fault tolerant system in which secure data can be efficiently transmitted from a single source and accessed by multiple clients without the source having knowledge or direct communication with the clients.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
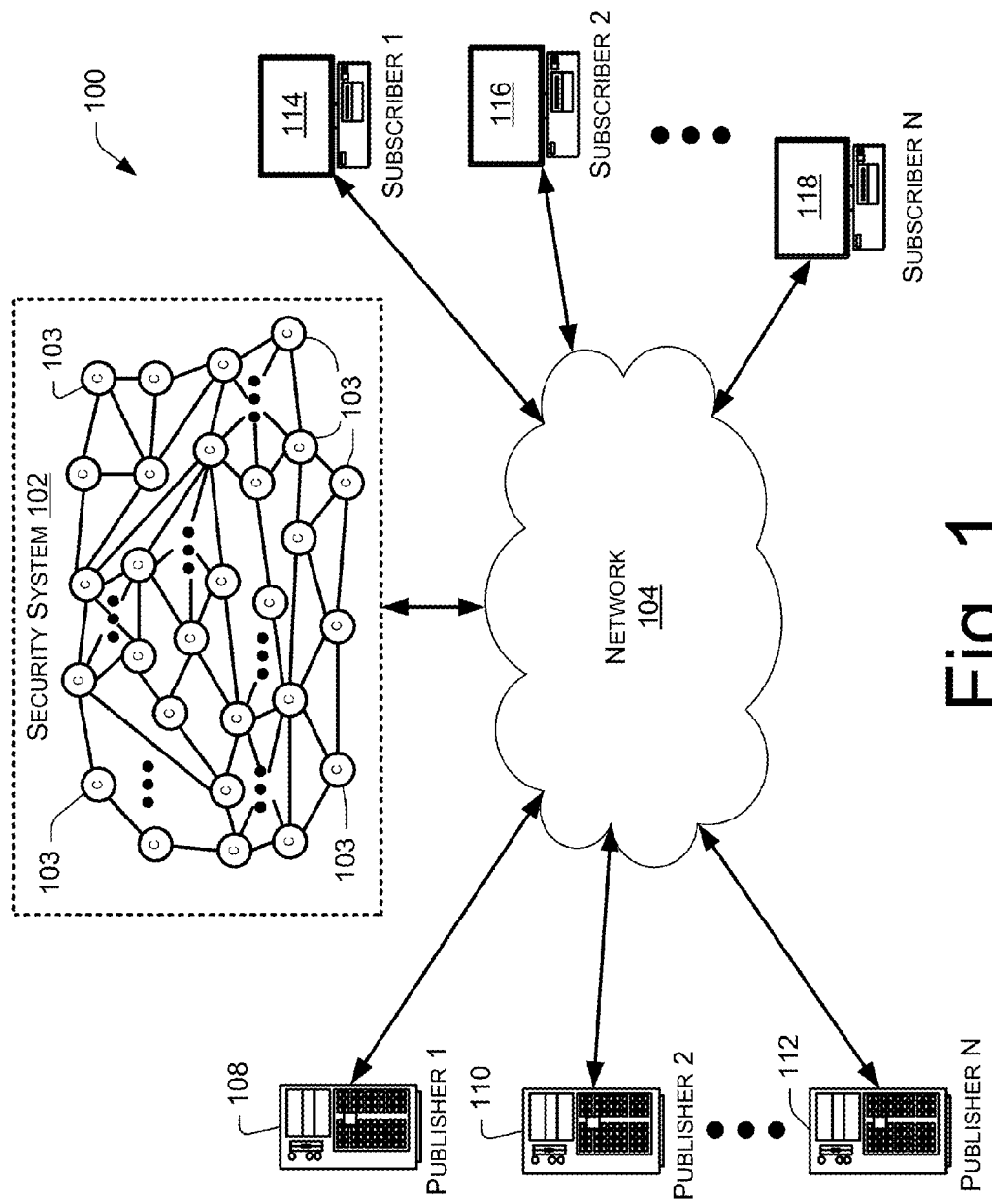
FIG. 1 is a pictorial diagram of a distributed, fault tolerant key sharing environment, according to one implementation.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes, in part, a fault tolerant, distributed security system for securely storing and distributing information, such as private keys. For example, a publisher of data may provide a publication private key to the security system for use by others in decrypting published data encrypted with a publication public key. The publication private key may be encrypted by the publisher using a security system public key and transmitted in the encrypted form to the security system. The security system stores the encrypted publication private key in numerous computing resources that make up the security system. To ensure security of the publication private key, no computing resource of the security system has the information (security system private key) necessary to decrypt the encrypted publication private key.

A client (e.g., subscriber) desiring access to data encrypted with the publication public key may communicate with the security system and obtain the publication private key, without the publication private key being exposed. For example, the subscriber may provide to the security system a blinding factor (e.g., a randomly generated code or sequence) encrypted with the security system public key. The computing resources of security system may use the encrypted blinding factor to compute a product of the encrypted publication private key and the encrypted blinding factor, that remains encrypted with the security system public key and then partially decrypt the product using their assigned security system private key shares. Finally, one of the computing resources may collect the partial decryptions and utilize threshold decryption to obtain the product of the publication private key and the blinding factor. The resulting product may then be returned to the subscriber. The subscriber, having knowledge of the blinding factor can then extract the publication private key.

While the examples described herein primarily focus on the use of the security system to securely store and distribute keys, such as private keys, it will be appreciated that the security system may be utilized to securely store and distribute any form of digital information or data that the providing party desires to keep secure. In general, the distributed, fault tolerant security system provides the ability for a publisher of digital data or information to securely store and distribute that information or data to multiple entities without the security system having knowledge of the data or information being shared. In addition, the security systems enable delivery to multiple entities without the publisher of the information ever having to communicate or know of the entities that are receiving the information.

FIG. 1 is a pictorial diagram of a distributed key sharing environment 100, according to one implementation. The distributed key sharing environment 100 may include any number and type of publishers, such as publisher 1 108, publisher 2 110 and publisher N 112, any number and type of clients, such as subscriber 1 114, subscriber 2 116 and subscriber N 118, and a security system 102, which includes multiple computing resources, for securely storing and distributing keys in a distributed, fault tolerant manner. In this implementation, the publishers 108-112 and subscribers 114-118 communicate with the security system 102 via a network 104. The network 104 may include a local area network, a wide area network, such as a public switched telephone network (PSTN), a cable television network, a satellite network, a collection of networks, a public Internet protocol network, a private Internet protocol network, or a combination thereof. Moreover, the network 104 may be wired, wireless, or a combination of the two.

The publishers 108-112 may or may not communicate via the network 104 with the subscribers 114-118. For example, the publishers may only use the network 104 to provide publication private keys to the security system 102 and may send data encrypted with the private key over a different network. Such an example is discussed in further detail below with respect to FIG. 6.

The security system 102 includes multiple computing resources 103 that store encrypted copies of the publication private keys, thereby enabling continuous operation, even if some of the computing resources fail. In some implementations, the computing resources 103 may communicate over an unreliable and insecure link, such as the network 104 and the message delivery delays between the computing resources 103, as well as between the publishers 108-112 and the security system 102 and the subscribers 114-118 may be asynchronous.

In one implementation, the security system 102 is implemented as a quorum system, such as a Byzantine Quorum System. The quorum system allows operation by allowing processing of requests, such as decryption, by only a subset of the computing resources 103. The subset of computing resources is called a "quorum." Any two quorums have a nonempty intersection that contains a sufficient number of correct computing resources (ensuring consistency). Also, there is at least one quorum in the system that is formed only by correct computing resources (ensuring availability).

The size of the quorum and the total number of computing resources 103 required are dependent on the type of quorum system used which itself is dependent on whether the data is self-verifiable or not. In the environment 100, the data stored in the security system include publication private keys, which are not self-verifiable. Self-verifiable data is a type of data that faulty computing resources can fail to redistribute but cannot undetectably alter. Private keys are not generally considered self-verifiable because the values are the public encryption of the confidential information and therefore anyone with access to the public key can create the values.

In the implementation for storing non-self-verifiable data, such as that of the environment 100, an opaque masking quorum system may be used. In such a system the minimum number of computing resources 103 needed to tolerate t faults is n=5t, with the quorum size being (2n+3t)/3.

In the case of opaque masking quorums, the number of correct computing resources 103 needed in a quorum is n+1, because at least two correct computing resources 103 are needed because the data is not self-verifiable. Likewise, the intersection between computing resources 103 needs to have a higher number of correct computing resources 103 than the number of faulty computing resources 103 so that a correct response may be obtained.

The publishers 108-112 may be any type of computing resource that desires to securely publish data. For example, a publisher may be a personal computer, a tablet computer, an eBook reader device, a laptop computer, a desktop computer, a netbook, a personal digital assistant (PDA), a portable gaming device, a wireless communication device, such as a smart phone or mobile handset, a set-top-box, a game console, a server, a control system, a management system, an operations system, or any combination thereof. As will be described in further detail below, a publisher 108-112 is configured to published data encrypted with a publication public key. The data may be published on the network 104 or on another network, as described in further detail below.

Likewise, the subscribers 114-118 may be any type of computing resource that desires to receive encrypted data. For example, a subscriber may be a personal computer, a tablet computer, an eBook reader device, a laptop computer, a desktop computer, a netbook, a personal digital assistant (PDA), a portable gaming device, a wireless communication device, such as a smart phone or mobile handset, a set-top-box, a game console, a server, a control system, a management system, an operations system, or any combination thereof. As will be described in further detail below, a subscriber 108-112 is configured to receive published data encrypted with a publication public key and decrypt that data using a publication private key obtained from the security system 102. The published data may be received from the network 104 or on another network, as described in further detail below. In some instances the same computing component may act as both a publisher and a subscriber.

The environment 100, in addition to being fault-tolerant, allows the secure storage and distribution of keys between publishers and subscribers, without the publishers having to communicate with or even know the identity of the subscribers. In one implementation, the security system 102 allows the secure storage and sharing of private keys used in asymmetric cryptography between publishers and subscribers.

In addition to utilizing public keys and private keys to securely distribute data, asymmetric key cryptography offers functionality beyond the capabilities of other forms of cryptography, such as symmetric key cryptography. For example, asymmetric key cryptography can be used to implement digital signatures which ensure the authenticity and integrity of the data being signed. An entity (e.g., publisher, security system, computing resource, subscriber) can generate a digital signature for a data item by invoking a digital signature algorithm using its private key known only to that entity. Another entity with knowledge of the corresponding public key can verify the integrity of the message by applying a signature verification algorithm to the digital signature. Because the private key that is used to generate the signature is known only to entity, no one except that entity can produce such a signature. Any entity who knows the corresponding public key can verify the signature and be convinced that the message was signed by the sending entity and has not been subsequently altered by others.

In some implementations, the security system 102 utilizes asymmetric key cryptography to ensure the confidentiality and integrity of key-values stored at the computing resources 103 and to ensure the authenticity of request and response messages sent and received at the security system 102. The security system 102 maintains a single security system public-private key pair. The security system private key is kept confidential, even from the computing resources 103 within the security system 102, while the security system public key is published to all the clients (publisher, subscriber, etc.).

Each computing resource 103 maintains its own public/private key pair, with the public key known to the other computing resources 103 within the security system 102. These public keys allow the computing resources 103 to authenticate the sender as well as check the integrity of the messages that they exchange with other computing resources within the security system 102. In some implementations, the publishers and subscribers do not need to have any knowledge of the public keys of the computing resources 103 of the security system 102 and may simply use the public key of the security system 102 to communicate with the security system 102. This structure allows a multitude of clients (e.g., subscribers and publishers) and allows computer resource keys to be changed without having to notify the clients.

Because the clients communicate with the security system 102 using the security system public key, maintaining secrecy of the security system private key is important. Accordingly, the security system private key is distributed across the computing resources 103 such that each computing resources 103 has a portion or share of the security system private key. Data encrypted with the security system public key can only be decrypted by multiple computing resources 103 working together to decrypt the data—a process known as threshold cryptography.

In one implementation, the security system 102, capable of tolerating t faults, employs (n, t+1) threshold cryptography to distribute the security system private key to all computing resources in such a way that the key shares reveal no information about the security system private key and at least t+1 computing resources 103 are necessary to digitally sign a message or decrypt data encrypted with a corresponding public key. One main goal of threshold cryptography is to perform the procedures of digital signature or decryption without ever reconstructing the private key. The steps involved in a (t+1, n) threshold cryptography process are:

In the initial stage, a security system 102 initially generates n security system private key shares ($s_i$, $\epsilon i\{1, \ldots n\}$), n verification keys ($v_i$, $\epsilon\{1, \ldots n\}$), the group verification key (v) and the security system public key (PK) used to validate signatures.

Next, the security system 102 sends these security system private key shares to different computing resources 103 within the security system 102. Thus, each computing resource 103 receives its security system private key share and its verification key. The security system public key and the verification keys are available to every computing resource 103 within the security system 102. After this initial setup, the computing system is able to generate signatures.

To obtain a signature (A) to some data (d), each computing resource 103 generates its partial signature of $a_i$ (also referred to herein as signature share) of d. Later, one of the computing resources 103, referred to herein as a "delegate", collects at least t+1 valid partial signatures ($a_1, \ldots a_k$) and creates a signature A through the combination of those t+1 valid partial signatures.

A (n, t+1) threshold decryption process works in a manner analogous to the threshold signature process, except that instead of generating a signature, it results in the decrypted value of the ciphertext. The use of threshold cryptography ensures that the private key is stored securely and an unauthorized entity must compromise more than t computing resources to learn the private key.

To further ensure the security of the private key and the encrypted data, blinding may be used so that the encrypted data, even when decrypted, remains secure. Blinding allows a subscriber to have a computing resource, such as a computing resource 103 of the security system 102, compute a mathematical function y=f(x), wherein the subscriber provides an input x and retrieves a corresponding output y, but the computing resource would not learn about either x or y.

For example, a computing resource may decrypt E(x) using a decryption function D and some private key $k_{cr}$ which is not known to the subscriber. The blinding process then works as follows:

The subscriber generates a blinding factor $b_s$ and calculates blinded ciphertext m'=E(x)*E($b_s$).
The subscriber sends m' to the computing resource
The computing resource applies the decryption function D(m',$k_{cr}$) to obtain the x'=x*$b_s$ and sends x' to the client.
The client divides x' by the blinding factor $b_s$ and the result is the desired plaintext x.

For the blinding process to work, the cryptographic process used must be blindable. A cryptographic process is blindable if its encryption function E and decryption function D are both homomorphic (i.e., E(a*b)=E(a)*E(b) and D(a*b)=D(a)*D(b)).

As noted above the publication private key k stored in the computing resources 103 of the security system 102 is encrypted using the security system public key. This implies that the maximum size of the keys ($|k_{max}|$) that can be stored in the security system 102 is directly related to the maximum secret size ($|S_{max}|$) supported by the threshold cryptosystem used in the security system 102. Also, because the publication private key value to be provided to a subscriber is blinded so as to ensure its confidentiality while in transit, the key size is also limited by $|k_{max}*b| \leq |S_{max}|$. In order to enable the storage of private keys with greater length, the process of masking may be utilized. This process for a publisher to store a key for name works as follows:

Generate a random key $k_s$ for a symmetric key algorithm. The size of symmetric key (Mask key) is dependent on the level of security required, but should be less than $|S_{max}|$.
Associate an arbitrary name $N_s$ with the symmetric key $K_s$ and store this binding in the computing resources 103 of the security system 102.
Store the private key value k for name N in the computing system resources of the security system. In the request message, instead of encrypting the private key k with the security system public key, encrypt the private key using the symmetric key $K_s$. This allows the size of the key-value to be independent of the threshold cryptosystem and hence allows the storage of longer keys. The corresponding key value stored in the security system 102 is referred to as the master key value.

To obtain the private key k associated with a name N to distribute to a subscriber, the masked key value is returned instead of the timestamp (timestamps are discussed in further detail below). The process of reading the private key now works as follows:

Obtain the symmetric key $K_s$ for the name $N_s$.
Obtain the masked key value $k_m$ for the name N.
Decrypt the masked key value $k_m$ using the symmetric key $K_s$ to obtain the desired private key k.

Figure 2:
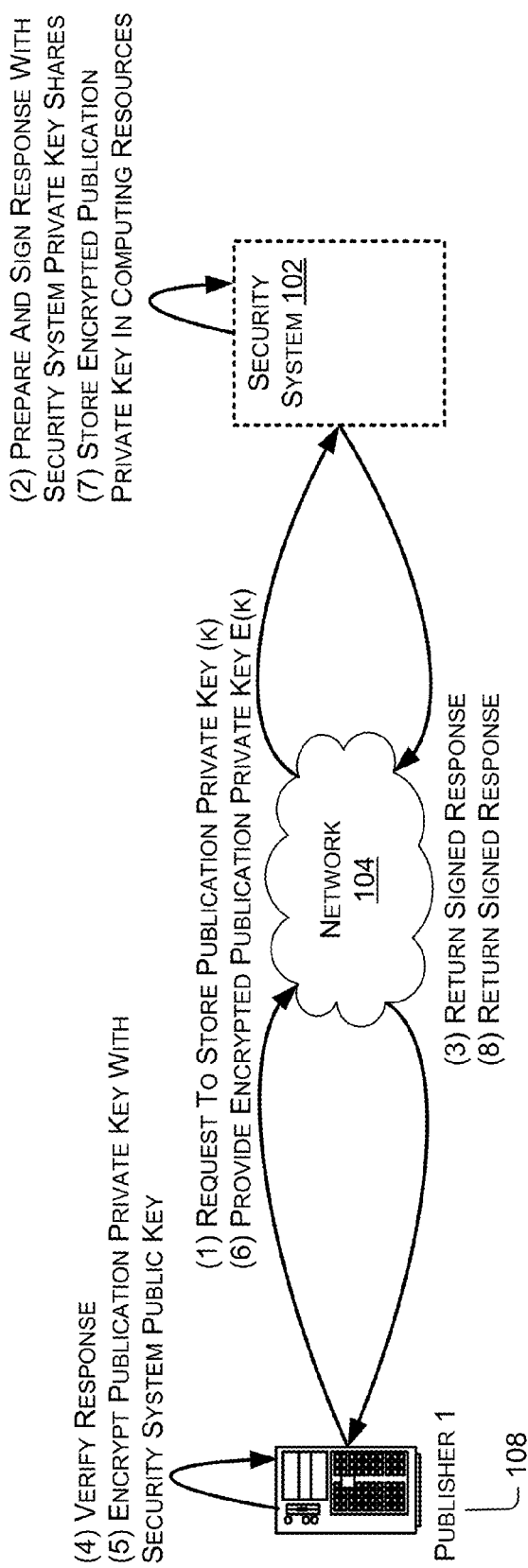
FIG. 2 is a pictorial transition diagram for storing a private key in a distributed security system, according to one implementation.

FIG. 2 is a pictorial transition diagram for storing a private key, such as a publication private key, in a distributed security system 102, according to one implementation. At an initial point, a publisher 108 sends a request to the security system via the network 104. In some implementations, the request may simply be a connection or invocation request to establish communication between the subscriber and one of the computing resources of the security system 102. For example, the request may simply include a timestamp and a name N, such as the name of the publication for which a publication private key will be stored. In some implementations, the initial request may be encrypted using the security system public key. Likewise, the request may be digitally signed by the publisher 108 using the publisher's private key.

The publisher's request is received by one or more computing resource 103 of the security system 102 and one of those computing resources 103 becomes the delegate for managing the communication between the publisher 108 and the computing resources 103 of the security system 102. The delegate may verify the request is from the publisher 108 by verifying the signature using the publisher's public key. In addition, the delegate, in preparing and signing a response, forwards the request to the other computing systems of the security system and awaits timestamps for name N from a quorum of computing resources 103. Timestamps are associated with a binding of the name N stored in the computing resources 103. The timestamp is assigned in increasing order, depending on the request sent by the publisher 108. For bindings or names that do not yet exist in the computing resource 103, the computing resource 103 assigns a timestamp of zero.

Upon receiving response from the other computing resources 103, the delegate then selects the timestamp returned by a majority of the computing resources or the higher timestamp in case there are multiple returned timestamps with the same cardinality. The delegate then generates a signature on the response by sending it to other computing resources, which send back partial signatures to the delegate. The delegate combines the partial signatures to get the signed response, which includes the timestamp and the original message from the publisher 108 and sends it back to the publisher 108. The publisher 108 verifies the authenticity of the response.

Upon verifying the response from the delegate of the security system 102, the publisher 108 encrypts the publication private key (k) that it desires to provide to the security system 102 for storage and distribution using the security system public key. The encrypted publication private key E(k) is then sent to the delegate. The message sent to the delegate may include the encrypted publication private key E(k), the response message received from the delegate, the name N, and/or a non-malleable proof $\pi(k, p)$. The response message may be included to make the operation indempotent. The inclusion of the entire message and not just the timestamp value is typically done because the publisher cannot be trusted to provide the correct value of the timestamp and malicious entities may send a large value to exhaust the timestamp space. With the signed response, the computing resources 103 of the security system 102 can check the validity of the response message and be sure that the sent timestamp value is indeed valid.

The non-malleable proof $\pi(k, p)$ shows that the publisher p knows the plaintext of the publication private key k, along with the ciphertext E(k). This is used to protect against a malicious entity reading the publication private key k. Non-malleable proofs are known and will not be discussed in further detail herein.

The delegate, upon receiving the publication private key, prior response from the delegate, the name N and/or the non-malleable proof, forwards the information to the computing resources 103 and awaits a confirmation message from a quorum of computing resources. In preparing a confirmation message, each responding computing resource 103 of the security system 102 updates is own storage component to include the encrypted publication private key E(k) if the timestamp for the name N included in the publisher's request is greater than or equal to the timestamp the computing resource has stored for the same name N. Likewise, the computing resource 103 may also update its own storage if the local hash stored for the name N is equal to the hash for the current request from the publisher 108.

The delegate, upon receiving a response from each of the quorum computing resources 103 within the security system 102 generates a signature for a response by sending it to other computing systems 103. Those computing resources 103 then send back partial signatures to the delegate. The delegate combines the partial signatures to get the signed response containing the timestamp and sends this back to the client and optionally to the other computing resources 103 of the security system 102.

Figure 3:
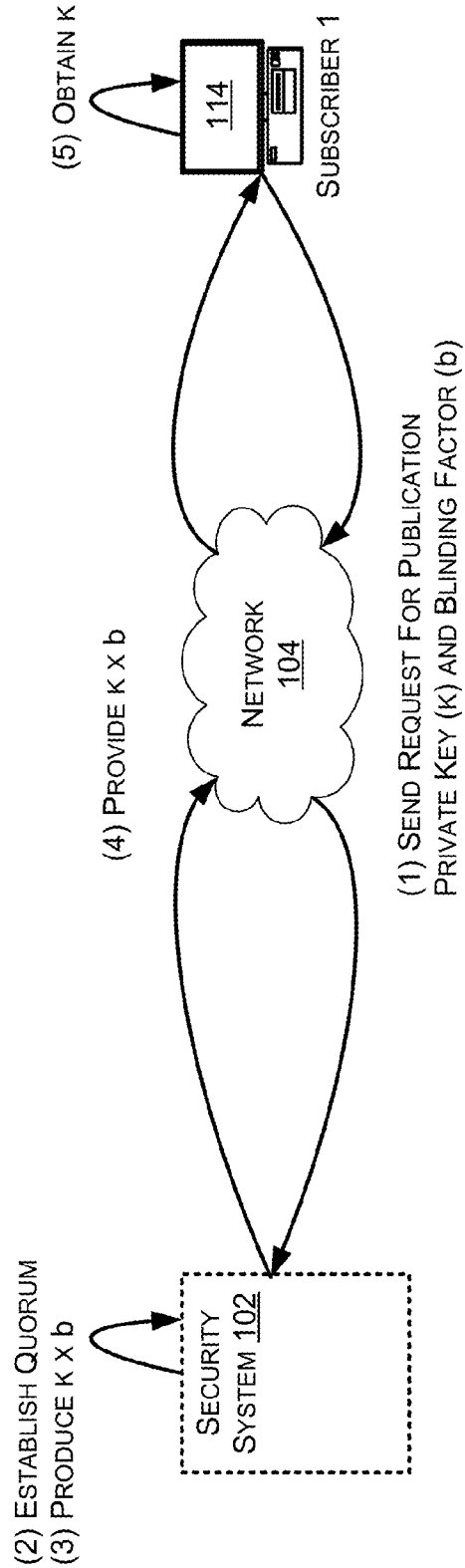
FIG. 3 is a pictorial transition diagram for obtaining a private key from a distributed security system, according to one implementation.

FIG. 3 is a pictorial transition diagram for obtaining a private key, such as a publication private key, from a distributed security system, such as the security system 102, according to one implementation. To ensure confidentiality of a requested publication private key while in transit to a subscriber 114, the process of blinding may be employed. In the request for a publication private key, the subscriber 114 sends a random blinding factor $b_s$ encrypted using the security system public key, a name N, and/or a non-malleable proof $\pi(b_s, s)$. As noted above, the non-malleable proof illustrates to the receiving computing resource that the subscriber 114 knows the plaintext $B_s$, along with the ciphertext $E(b_s)$.

Upon receiving a request from a subscriber for a publication private key, one of the receiving computing resources 103 of the security system 102 operates as a delegate to manage communication between the subscriber 114 and the security system 102. The delegate, upon receiving the request, forwards the request to the computing resources of the security system 102 and awaits bindings from the names N from a quorum of computing resources 103. Upon receiving bindings from a quorum of computing resources, the delegate selects a set of computing resources. In one example, the selected computing resources constitute a majority of the computing resources in some quorum and each computing resource in that set has the same timestamp.

In addition to providing the bindings, the computing resources also combine the encrypted blinding factor $E(b_s)$ with the stored encrypted publication private key E(p) to produce the product $E(b_s * p)$. In addition, the computing resources partially decrypt the product $E(b_s * p)$ using the security system private key share maintained by each respective computing resource. The partially decrypted products are then delivered to the delegate and the delegate performs threshold decryption by combining the partial decryptions to obtain the product $b_s*p$. Finally, the product $b_s*p$ is sent back to the subscriber 114 along with a copy of the request.

The subscriber 114 utilizes its knowledge of the blinding factor b, to obtain p by dividing the product $(b_s*p)/b_s$. The process of utilizing a blinding factor in conjunction with threshold decryption allows transfer of a private key from a publisher to a subscriber through an intermediary (security system 102) without the intermediary ever knowing the plaintext of the private key, without the plaintext of the private key being exposed and without the publisher having to communicate with or have knowledge of the subscriber.

As discussed above, the security system may be used to protect the storage and sharing of private keys so that publishers of data can publish encrypted data that can be received and decrypted by multiple subscribers. Using the security system 102, the subscribers can obtain the needed publication private key from the security system 102 without ever communicating directly with the publishers. This provides opportunities for multiple communication systems that deploy data from a publisher to multiple subscribers. For example power grid data networks (or "smart grids") often have publishers that publish data to multiple subscribers within the system. Even though the subscribers may be authorized within the network they may not want to share information that they are receiving and/or publishing. Likewise, because there are multiple subscribers, the system benefits from allowing subscribers to obtain the information needed to decrypt a publication without the publisher having to communicate with the subscriber, or even know of the subscriber.

To illustrate further, some power grid systems implement a system management component that utilizes a rate-based system to systematically manage the delivery of data to subscribers to ensure a desired minimum quality of service ("QoS") for each subscription. For example, publishers of power grid data, such as transmission substations, identify to the system management component the rate at which they will publish data. Subscribers, such as control centers, regional security coordinators, neighboring control centers, other substations, etc. will also communicate with the system management component and identify the data to which they wish to subscribe, the desired data rate, desired latency and desired availability (collectively "desired QoS"). The subscribers may also identify a minimum acceptable data rate, minimum acceptable latency and a minimum acceptable availability level (collectively "minimum QoS"). Utilizing this information, the system management component will implement routing that will provide the desired QoS for the subscription under normal conditions and provide at least the minimum QoS under all but the most extreme conditions. In addition, because each subscriber can specify different desired QoS, the system management component can individually manage the QoS provided to each subscriber (or collectively manage subscriptions with the same desired QoS and/or minimum QoS) and, if needed, adjust that QoS provided to account for network changes (e.g., increased system load, data path disruptions, failures) and/or changes to the power grid. The subscribers will still receive the subscribed to data at a QoS at least matching the minimum QoS and will still be able to utilize the data delivered at a reduced QoS without concern or disruption.

In addition to the ability to manage data delivery to different subscribers, the publishers do not have to worry about delivering data to each subscriber or delivering data at different rates. Publishers may simply notify the system management component of the rate at which data will be published and the system management component may control the routing, filtering, availability and delivery of that data to the different subscribers at each subscriber's desired QoS. Likewise, utilizing the security system, the publisher can provide the publication private key to the security system 102 and encrypt the publication with the publication public key. The security system 102 in coordination with the system management component can provide the publication private key to the appropriate subscribers without the publisher needing to know or otherwise communicate with the subscriber. This allows the publisher to securely publish the data such that it can only be accessed by subscribers that have obtains the publication private key from the security system 102.

Figure 4:
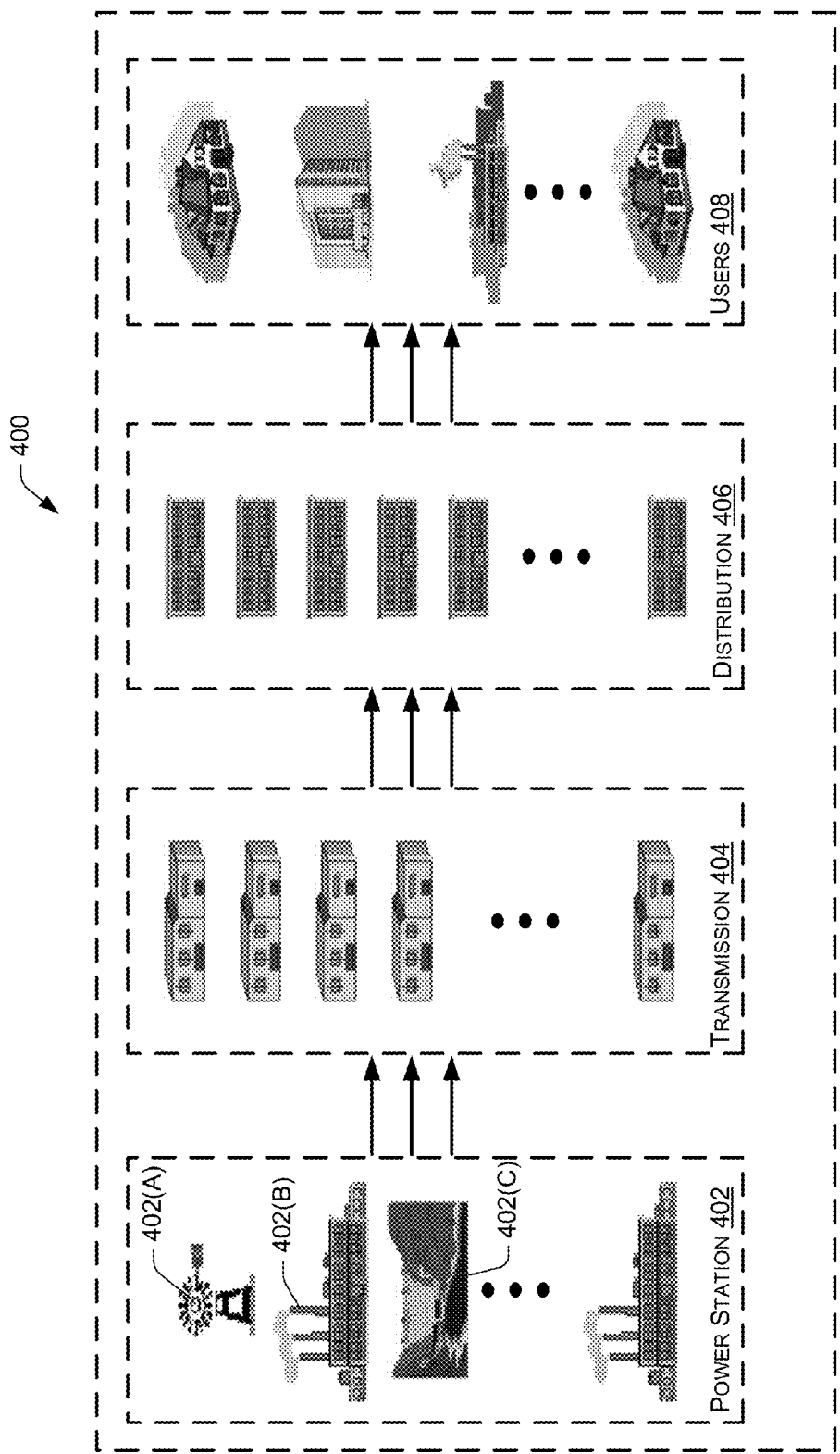
FIG. 4 is a pictorial diagram of a power grid system.

FIG. 4 is a pictorial diagram of a power system 400. The power system 400 typically includes one or more power stations 402, transmission 404, distribution 406 and users 408 that create demand for the power. Power stations 402 may include any form of power generation. For example, a power station 402 may be a wind based power station 402(A), such as a wind farm, a fossil-fuel based power station 402(B), a hydroelectric power station 402(C), etc. The power system 400 may include any number and type of power stations 402.

Electric-power generated by the power stations 402 is bulk transmitted at high-voltages via a series of transmission 404 lines and stations from the generating power stations 402 to distribution stations 406. Transmission 404 lines and stations when interconnected with each other create transmission networks, which are often referred to as "power grids." The United States has three major power grids, the Western Interconnection, the Eastern Interconnection and the Electric Reliability Council of Texas (ERCOT) grid, often referred to as the Western Grid, the Eastern Grid and the Texas Grid.

The distribution 406 stations are located near the users 408 that create the demand for the power. The distribution 406 stations receive the bulk transmissions, step down the voltage and distribute the electricity to end users 408, such as residential housing, businesses, commercial buildings, etc.

A few of the major constraints with power systems is that power within the system must run at the same frequency and, with only a few exceptions, electrical energy cannot be stored. As such, power must be generated and supplied in real-time at a rate that matches demand. If the demand for power exceeds supply, generation stations 402 and transmission 404 can shut down, causing brownouts or blackouts for hundreds or more customers.

To help protect against power disruptions and to manage the power system, data about the system itself, current power demand and available power supply are published to numerous monitoring tools and systems that regulate and control the operational state of the power system. Historically, these monitoring tools and systems (subscribers) included visual graphs that were presented to human operators. In such systems, the human portion allowed for missed packets of data and delay/inconsistency in the data being delivered without significant disruption. Also the rate of delivery was slow as only a limited amount of data can be viewed by humans at a given time. However, a growing number of the subscribers that receive published data about the power system are computer applications that work autonomously to adjust and/or monitor the state of the power system. Such systems often require that data be delivered consistently and at a specific QoS (rate, latency and availability), which is often higher than the QoS needed for applications involving human interaction. Also, with the growing number of subscribers and malicious entities, that data also needs to be securely delivered.

Subscribers and publishers can exist on a wide range of devices, ranging from embedded devices of limited computation power to high-power computers running modeling and/ or simulation applications within control centers. In addition, subscribers and publishers are roles played by the application or computing device and any application or computing device may be a publisher, subscriber or both.

Figure 5:
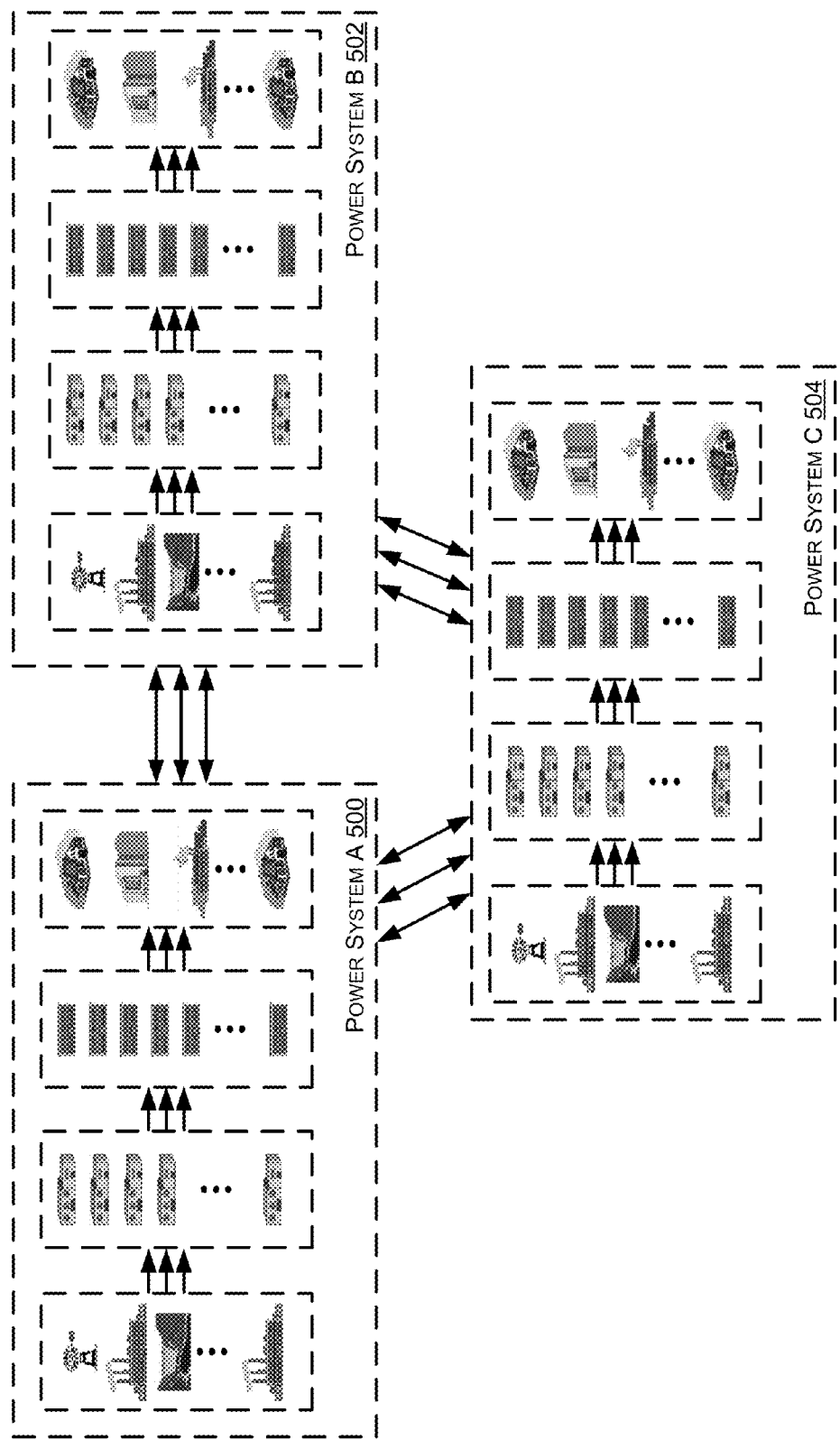
FIG. 5 is a pictorial diagram of multiple power grid systems.

In addition to the increasing number of subscribers that manage and monitor the power system 400 to protect against disruptions, many power systems are now interconnected and/or sharing data so that they can leverage other systems to protect against failure in a single power system, as illustrated in FIG. 5. For example, FIG. 5 illustrates three power systems interconnected with one another to help further balance power across systems and prevent disruptions to customers. For example, each of Power System A 500 (which may represent the Western Grid in North America), Power System B 502 (which may represent the Eastern Grid in North America) and Power System C 504 (which may represent the Texas Grid in North America) are connected and share power related data and information. This information, while beneficial in increasing knowledge between the power systems, adds yet more complexity to the need for managing in real-time the data sent from publishers of the various power systems to subscribers.

Figure 6:
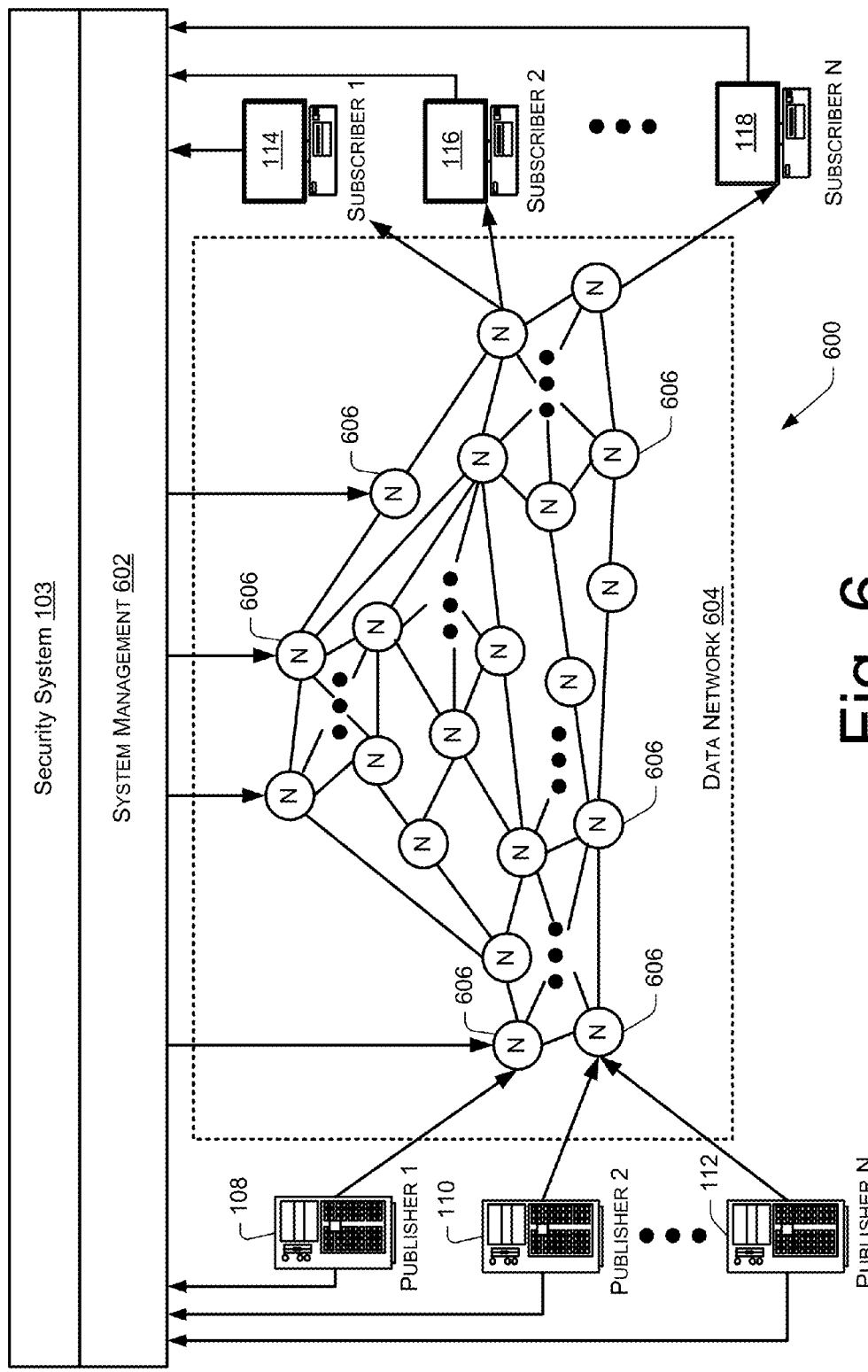
FIG. 6 is a pictorial diagram of a data delivery system for managing the delivery of power grid data from publishers to subscribers, in accordance with one implementation.

FIG. 6 is a pictorial diagram of a data delivery system 600 for managing the delivery of power grid data from publishers to subscribers, in accordance with one implementation. In this example, the system management component 602 manages network resources to achieve low-latency, reliable delivery of data produced anywhere on the network and sent to multiple other points. The system management component 602 allocates resources and adapts the data network 604 in response to changing power system configurations and/or communication network failures. In addition, the system management component 602 communicates with nodes 606 within the data network 604 to provide forwarding instructions for data published by the various publishers 608, 610, 612. The nodes 606 may be status routers, forwarding engines, message relays and/or any combination thereof. The nodes 606 forward the data published by the publishers 608, 610, 612 through the data network 604 to appropriate subscribers 614, 616, 618.

The system management component may also include, or be in communication with the security system 102 which provides storage and distribution of keys used to decrypt the data delivered over the data network 604. During establishment of a publication and/or subscription, the system management component 602 may cause the publisher and/or subscriber to communicate with the security system 102 (or a delegate of the security system) to provide or obtain a publication private key for use in decrypting data sent over the data network 604. Delivery or receipt of publication private keys may be accomplished over the data network and/or over any other network, such as network 104 (FIG. 1).

With the system management component 602 structure illustrated in FIG. 6, publishers 608, 610, 612 may subscribe to the system management component 602 and publish data that is distributed to subscribers 614, 616, 618 without the publisher 608, 610, 612 having to track, communicate or even know of the existence of the subscribers. This simplifies application programs and gives the system 600 the flexibility to add subscribers and even change the characteristics of existing subscriptions without disrupting the publishers 608, 610, 612. In some implementations, a publisher 608, 610, 612 may simply notify the system management component 602 of the availability of data and the rate at which the data will be published.

Likewise, the publishers 608, 610, 612 may subscribe to the security system 102 and provide a publication private key that is stored in the computing resources 103 of the security system and published to subscribers 614, 616, 618 that subscribe to the subscribers publication without the publisher 608, 610, 612 having to track, communicate or even know of the existence of the subscribers. This also simplifies application programs and gives the system 600 the flexibility to add subscribers and even change the characteristics of existing subscriptions without disrupting the publishers 608, 610, 612. Likewise, the publishers can easily change the public/private keys for the publication without having to directly notify the subscribers. In some implementations, a publisher 608, 610, 612 may simply notify the security system 102 of the updated publication private key and the security system 102, in conjunction with the system management component 602 will provide the updated publication private key to the appropriate subscribers in a secure fashion using the implementations discussed herein.

Subscribers 614, 616, 618 may request that the system management component 602 establish delivery data paths through the data network 604 to accomplish delivery of the data to the subscriber at a desired quality of service (QoS), including rate, latency and availability. In some implementations, a minimum QoS may also be specified, including a minimum acceptable data rate, minimum acceptable latency and minimum acceptable availability. A priority and/or security requirement for the subscription may also be provided. The system management component 602 confirms that the desired QoS can be satisfied based on the available resources and the publish rate of the data provided by the publisher. Likewise, the security system 102 may confirm that the desired security level can be maintained based on the structure of the security system, the threshold decryption scheme utilized and the required number of computing resources 103 required to decrypt an encrypted key. Once established, the desired QoS, minimum QoS and security parameters agreed to between the system management component 602 and the subscriber, the system management component 602 defines the necessary data path(s) needed to ensure the minimum QoS for availability and provides forwarding rules to the nodes 606 so the data is routed along one of those defined data paths and delivered to the subscriber at the desired rate with the desired latency. The security system communicates with the subscriber to securely provide the publication private key to the subscriber for use in decrypting the publications when received.

Figure 7:
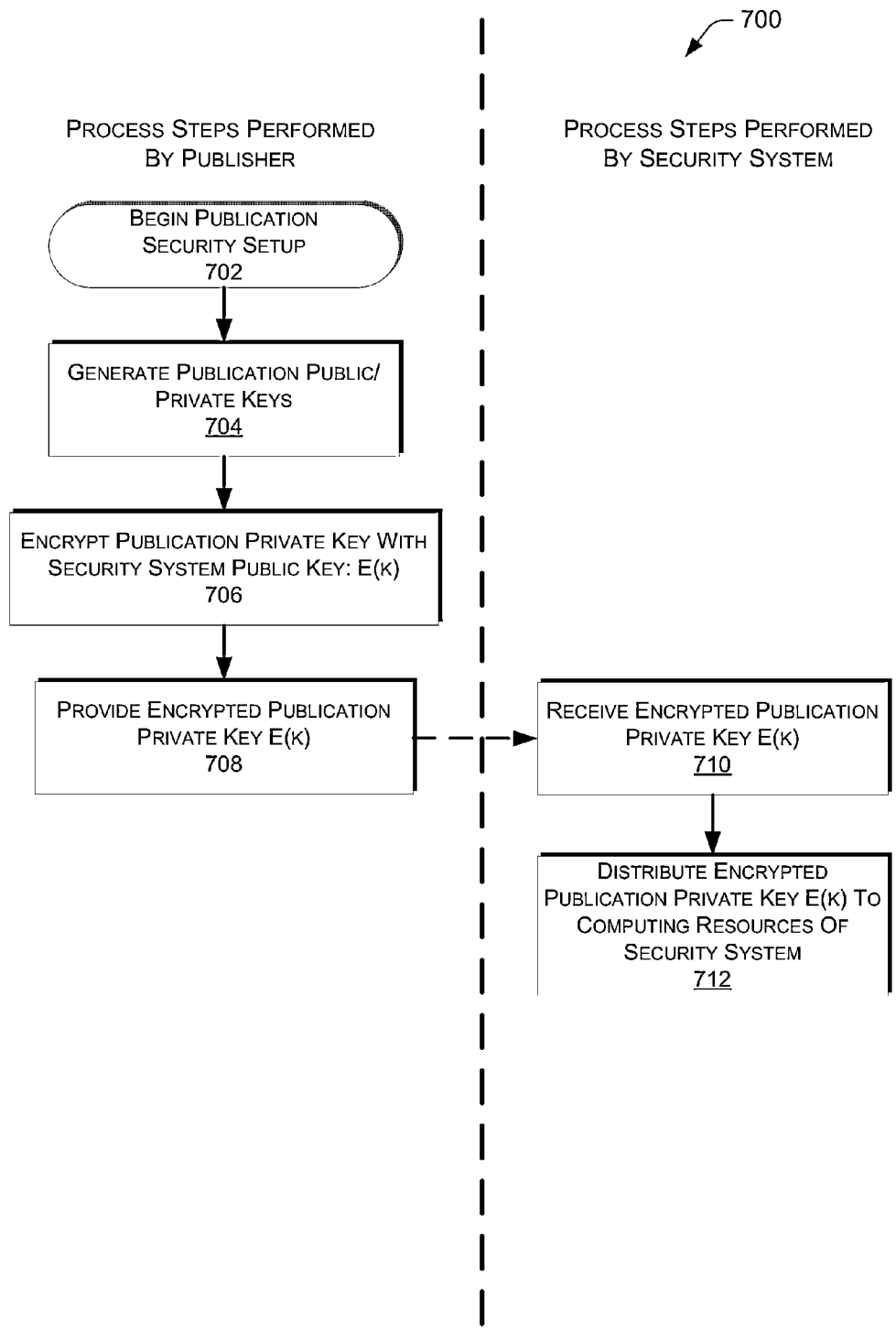
FIG. 7 is flow diagram of an example process for storing a private key in a distributed security system, in accordance with one implementation.
Figure 8:
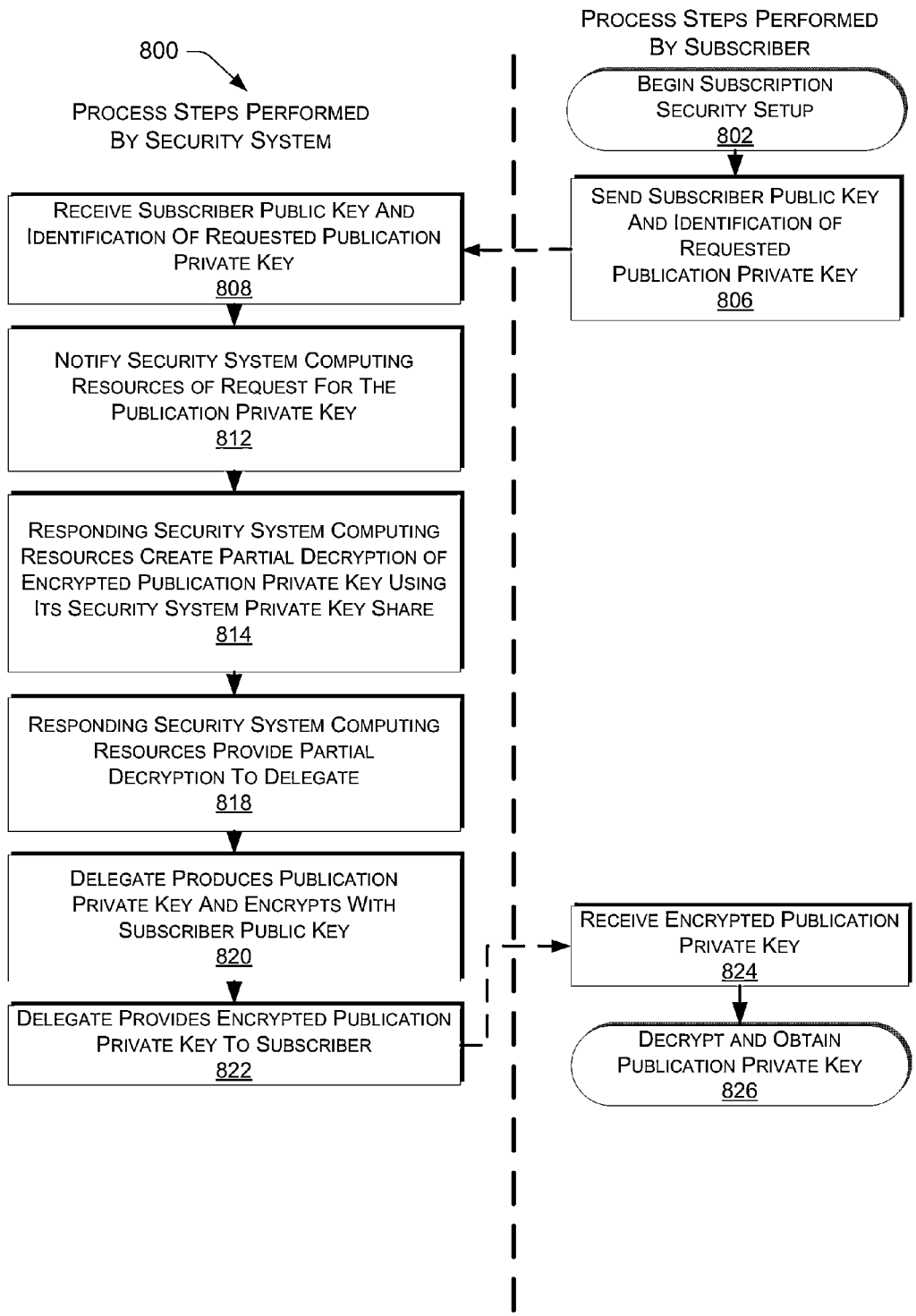
FIG. 8 is flow diagram of an example process for obtaining a private key from a distributed security system, in accordance with one implementation.
Figure 9:
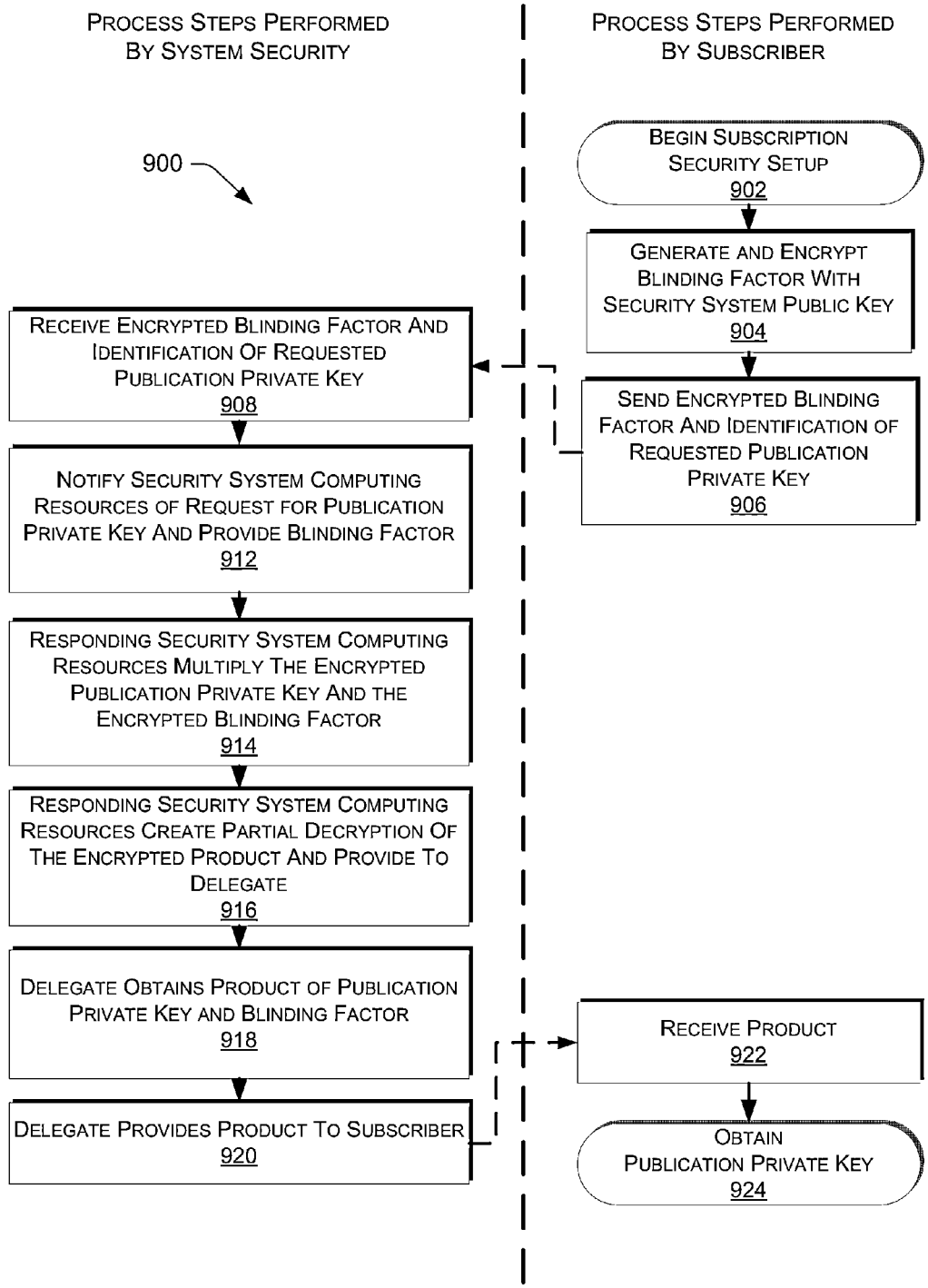
FIG. 9 is flow diagram of an example process for obtaining a private key from a distributed security system, in accordance with another implementation.

FIG. 7 is a flow diagram of an example process 700 for systematically adapting data delivery, in accordance with one implementation. The example process 700 of FIG. 7, as well as each of the other example processes described below with respect to FIGS. 8-9, is illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation and any number of the described operations can be combined in any order and/or in parallel to implement the process. Likewise, additional or fewer operations than those described may be utilized with the various implementations described herein.

The example process 700 illustrates steps performed by a publisher on the left side of the vertical dotted line and steps performed by a security system on the right side of the dotted line. In addition, the example process 700 does not detail the steps of verifying the communications between the publisher and the security system, as described above. However, in various implementations, verification, such as digital signature verification, may be included as part of the example process 700.

The example process begins as part of a publication security set up, as in 702. Publication security setup may be performed as part of the process of a publisher subscribing to a data management system for publishing content. Upon initiation of the publication security set up, a public/private key pair is established that will be used to encrypt and decrypt data published as part of the publication, as in 704. The generated publication private key is then encrypted with the security system public key. As discussed above, a security system public key is a single public key published by security system for use in encrypting data that is to be securely transmitted to the security system and stored. While the examples described herein refer to a single public/private key pair for the security system, in some implementations, the security system may maintain multiple public/private key pair combinations of security keys. In such an implementation, each public/private key pair may represent different levels of security that may be maintained by the security system. For example, one public/private key pair may be designated for high-security data that require a large number of computing resources within the security system to participate in threshold decryption of a publisher's stored publication private key. Another public/private key pair may be designated for lower security items do not require as many computing resources within the security system to participate in threshold decryption.

Upon encrypting the publication private key with the security system public key, the encrypted publication private key is transmitted from the publisher to the security system, as in 708. The security system 710 receives the encrypted publication private key 710 and distributes that encrypted publication private key to computing resources of the security system for storage, as in 712. As discussed above, the exchange of the encrypted publication private key between the publisher and the security system may be done by the security system designating one of the computing resources as a delegate for managing communication between the publisher and the security system. In such an implementation, the delegate will communicate with the publisher and receive the encrypted publication private key. Likewise, the delegate will provide the received encrypted publication private key to each of the computing resources of the security system for storage.

FIG. 8 is flow diagram of an example process 800 for obtaining a private key from a distributed security system, in accordance with one implementation. The example process 800 illustrates steps performed by a security system on the left side of the vertical dotted line and steps performed by a subscriber on the right side of the dotted line. In addition, the example process 800 does not detail the steps of verifying the communications between the security system and the subscriber, as described above. However, in various implementations, verification, such as digital signature verification, may be included as part of the example process 800.

The example process begins as part of the data subscription security set up, as in 802. Data subscription security setup may be performed as part of the process of a subscriber subscribing to a data management system to receive a subscription according to a defined QoS. As part of the data subscription security setup, a subscriber public key and an identification of the requested publication private key may be sent from a subscriber to the security system, as in 806. As discussed above, in some implementations, the security system may designate one of the computing resources within the security system to act as a delegate, managing communications between the security system and the subscriber. In such an implementation, the delegate of the security system receives the subscriber public key and the identification of the requested publication private key, as in 808. While the example process 800 describes the subscriber submitting a request that includes the subscriber public key and the identification of the requested publication private key, in other implementations, additional or fewer items of information may be included in a request for a publication private key. For example, the subscriber public key may already be known to or otherwise available to the security system and thus, omitted from the request for a publication private key.

Upon receiving the request for the publication private key, the delegate of the security system notifies a set of the security system computing resources of the request for the publication private key, as in 812. In some implementations, all of the security system computing resources maybe notified of the request. In other implementations, as discussed above, the delegate may designate a set of computing resources to participate in the preparation and delivery of the publication private key to the subscriber. In still other implementations, another combination of the computing resources within the security system may be selected for use in the preparation and delivery of the publication private key to the subscriber.

The security system computing resources, in response to receiving the notification, create a partial decryption of the stored encrypted publication private key using its security system private key share, as in 814. As discussed above, no single computing resource within the security system maintains an entire version of the computing resource private key. Instead, the security system private key is distributed among the computing resources of the security system as security system private key shares, with each computing resource maintaining a different security system private key share. Using threshold decryption, a designated number of the computing resources must cooperate to decrypt data encrypted with the security system public key.

Upon completing partial decryption of the stored publication private key, each responding security system computing resource provides the partial decryption to the computing resource of the security system designated as the delegate, as in 818. Communication between the security system computing resources may be performed using asymmetric or symmetric cryptography so that communication between the computing resources is secure. For example, the delivery of the partially decrypted publication private key may be transmitted in encrypted form between the computing resources of the security system by the sender of the computing resource encrypting the partial decryption of the publication private key with a public key associated with the computing resource acting as the delegate.

The computing resource of the security system acting as the delegate obtains the required number of partial decryptions of the publication private key and combines those partial decryptions using threshold cryptography to decrypt and obtain the publication private key, as in 820. As part of the process of obtaining the publication private key, the delegate re-encrypts the publication private key with the public key of the subscriber, also as in 820. Once the publication private key has been decrypted and re-encrypted with the subscriber public key the computing resource of the security system acting as a delegate provides the encrypted publication private key to the subscriber, as in 822, and the subscriber receives the encrypted publication private key, as in 824. Finally, the subscriber uses the subscriber private key to decrypt and obtain the encrypted publication private key, as in 826.

The example process 800 provides the ability for a publisher to generate and share a publication private key that is necessary to decrypt data published as part of a publication. Specifically, example process 800 allows the publisher to share the publication private key with any number of subscribers without needing to directly communicate with the subscribers or even know of the existence of those subscribers.

FIG. 9 is flow diagram of an example process 900 for obtaining a private key from a distributed security system, in accordance with another implementation. The example process 900 illustrates steps performed by a security system on the left side of the vertical dotted line and steps performed by a subscriber on the right side of the dotted line. In addition, the example process 900 does not detail the steps of verifying the communications between the security system and the subscriber, as described above. However, in various implementations, verification, such as digital signature verification, may be included as part of the example process 900.

The example process 900 begins as part of the data subscription security set up, as in 902. Data subscription security setup may be performed as part of the process of a subscriber subscribing to a data management system to receive a subscription according to a defined QoS. As part of the data subscription security setup, a blinding factor may be generated and encrypted using the security system public key, as in 904. As discussed herein, the blinding factor may be used to ensure that the publication private key is not exposed during the example process 900. The blinding factor may be a randomly generated number, code or other series of data for use in preventing the exposure of data as it is transitioned from one encryption public/private key pair to another.

Once the blinding factor is generated and encrypted using the security system public key, the encrypted blinding factor and an identification of the requested publication private key is sent from a subscriber to the security system, as in 906. As discussed above, in some implementations, the security system may designate one of the computing resources within the security system to act as a delegate, managing communications between the security system and the subscriber. In such an implementation, the delegate of the security system receives the encrypted blinding factor and the identification of the requested publication private key, as in 908. While the example process 900 describes the subscriber submitting a request that includes the encrypted blinding factor and an identification of the publication private key, in other implementations, additional or fewer items of information may be included in a request for a publication private key. For example, a subscriber public key may also be included in the request for use as another layer of cryptography when sending the results back to the subscriber.

Upon receiving the request for the publication private key, the delegate of the security system notifies a set of the security system computing resources of the request for the publication private key and provides the encrypted blinding factor, as in 912. In some implementations, all of the security system computing resources maybe notified of the request and provided the encrypted blinding factor. In other implementations, as discussed above, the delegate may designate a set of computing resources to participate in the preparation and delivery of the publication private key to the subscriber. In still other implementations, another combination of the computing resources within the security system may be selected for use in preparation and delivery of the publication private key to the subscriber.

The security system computing resources, in response to receiving the notification and the encrypted blinding factor, multiply the encrypted blinding factor with the encrypted publication private key to produce an encrypted product of the blinding factor and the publication private key E(b*p), as in 914. Each responding computing resource may then generate a partial decryption of the encrypted product using its security system private key share, as in 914. As discussed above, no single computing resource within the security system maintains an entire version of the security system private key. Instead, the security system private key is distributed among the computing resources of the security system as security system private key shares, with each computing resource maintaining a different security system private key share. Using threshold decryption, a designated number of the computing resources must cooperate to decrypt data encrypted with the security system public key.

Upon completing partial decryption of the encrypted product, each responding security system computing resource provides the partial decryption of the product to the computing resource of the security system designated as the delegate, as in 918. As mentioned above, communication between the security system computing resources may be performed using asymmetric or symmetric cryptography so that communication between the computing resources is secure. For example, the delivery of the partially decrypted product may be transmitted in encrypted form between the computing resources of the security system by the sender encrypting the partial decryption of the product with a public key associated with the computing resource acting as the delegate.

The computing resource of the security system acting as a delegate obtains the required number of partial decryptions of the product and combines those partial decryptions using threshold cryptography to decrypt and obtain the product (b*p), as in 920. As part of the process of obtaining the product, the delegate may encrypt the product using the subscriber public key. However, encrypting the product is not critical as it is still in ciphertext form and only understandable by an entity with the blinding factor (p)—which only the subscriber knows. Once the product (b*p) has been decrypted the computing resource of the security system acting as a delegate provides the product to the subscriber, as in 920, and the subscriber receives the product, as in 922. Finally, the subscriber divides the product (b*p) by the blinding factor (b) to obtain the publication private key (p), as in 924.

The example process 900 provides the ability for a publisher to generate and share a publication private key that is necessary to decrypt data published as part of a publication. Specifically, the example process 900 allows the publisher to share the publication private key with any number of subscribers without needing to directly communicate with the subscribers or even know of the existence of those subscribers. In addition, through use of a blinding factor, the publication private key is not exposed or known to the security system that is storing and distributing the private key to subscribers.

Figure 10:
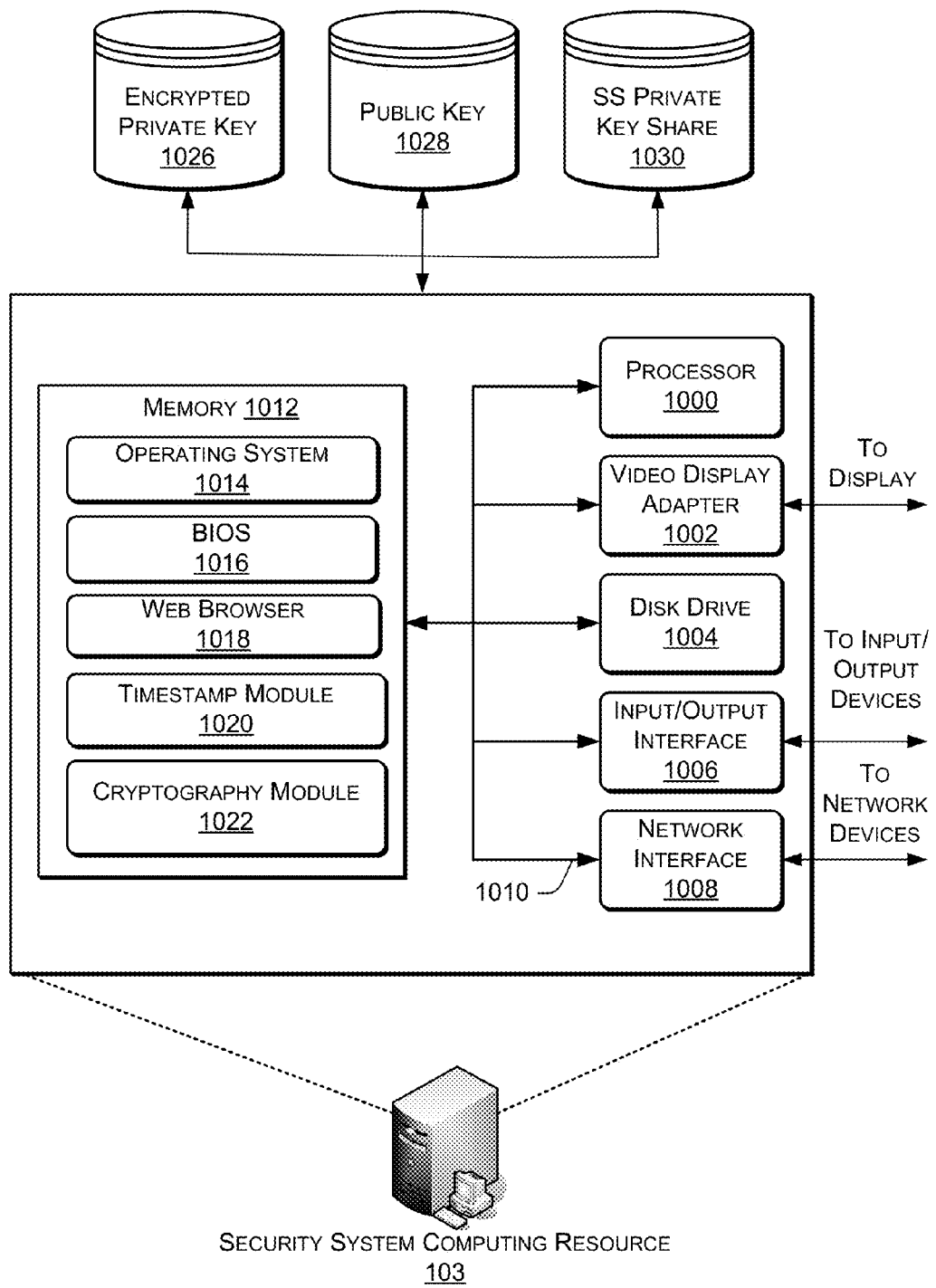
FIG. 10 is a pictorial diagram of an illustrative implementation of a security system computing resource implemented as a server system that may be used with the various implementations.

FIG. 10 is a pictorial diagram of an illustrative implementation of a server system, such as one of the computing resources 103, that may be used in the environments described herein. The computing resource 103 may include a processor 1000, such as one or more redundant processors, a video display adapter 1002, a disk drive 1004, an input/output interface 1006, a network interface 1008, and a memory 1012. The processor 1000, the video display adapter 1002, the disk drive 1004, the input/output interface 1006, the network interface 1008, and the memory 1012 may be communicatively coupled to each other by a communication bus 1010.

The video display adapter 1002 provides display signals to a local display (not shown in FIG. 10) permitting an operator of the computing resource 103 to monitor and configure operation of the computing resource 103. The input/output interface 1006 likewise communicates with external input/output devices not shown in FIG. 10, such as a mouse, keyboard, scanner, or other input and output devices that can be operated by an operator of the computing resource 103. The network interface 1008 includes hardware, software, or any combination thereof, to communicate with other computing devices and/or other computing resources. For example, the network interface 1008 may be configured to provide communications between the computing resource 103 and other computing devices, such as publishers 608, 610, 612, subscribers 614, 616, 618 and/or nodes 606 within the network, as shown in FIG. 6.

The memory 1012 generally comprises random access memory (RAM), read-only memory (ROM), flash memory, and/or other volatile or permanent memory. The memory 1012 is shown storing an operating system 1014 for controlling the operation of the system management component 602. A binary input/output system (BIOS) 1016 for controlling the low-level operation of the computing resource 103 is also stored in the memory 1012.

The memory 1012 additionally stores program code and data for providing network services that allow publishers, subscribers, the system management component and other computing resources 103 to exchange information and data files with the computing resource 103. Accordingly, the memory 1012 may include computer executable instructions that when executed by the processor 1000, enable communication between the publishers, subscribers, the system management component, other computing resources and the computing resource 103. The computing resource 103 communicates with the publisher to obtain publisher information, such as the publisher identification and encrypted publication private keys that are to be stored in the encrypted private key storage data store 1026 of the computing resource 103 and distributed to other computing resources within the security system 102. Likewise, the computing resource 103, through the computer executable instructions, may communicate with subscribers to receive requests for publication private keys and blinding factors for use in securely preparing and transmitted stored publication private keys to the subscriber. Information and requests received from both publishers and subscribers may include, or the computing resource may otherwise obtain public key information for the subscribers and publishers, or any other client that communicates with the security system and maintains those public keys is a public key data store 1028.

Additionally, the memory 1012 may also include a timestamp module 1020 and a cryptography module 1022. The modules 1020-1022 may be executable by the processor 1000 to implement one or more of the functions of the computing resource 103. In one implementation, each of the modules 1020-1022 may represent instructions embodied in one or more software programs stored in the memory 1012. In another implementation, the modules 1020-1022 can represent hardware, software instructions, or a combination thereof.

In some implementations, the timestamp module 1020 is configured to generate timestamps for bindings of names and encrypted keys and/or other information. The cryptography module 1022 may be configured to encrypt and decrypt ciphertext, or partially decrypt ciphertext using the public/private keys obtained and maintained in the public key data store 1028 and/or the security system private key share data store 1030 using any one of a variety of cryptography techniques. The cryptography module may also be configured to perform threshold decryption and combine partially decrypted information obtained from other computing resources within the security system.

Although the computing resource 103 is illustrated in this example as a single server system, in other implementations, the computing resource 103 may be implemented over any number of local and/or remote server systems. Likewise, the encrypted private key data store 1026, public key data store 1028 and the security system private key share data store 1030 may be integrated with the computing resource 103 or otherwise communicatively coupled with the computing resource 103. For example, one or more of the encrypted private key data store 1026, public key data store 1028 and/or the security system private key share data store 1030 may be located at a remote computing resource (not shown) and communicatively coupled with the computing resource 103. In some implementations, the encrypted private key data store 1026, public key data store 1028 and/or the security system private key share data store 1030 may include one or more CD-RW/DVD-RW drives, hard disk drives, tape drives, or other storage devices that are utilized to store digital content and information. As used in this disclosure, the data stores may include lists, arrays, databases, and other data structures used to provide storage and retrieval of data. Likewise, while the disclosure describes multiple data stores, in some implementations the data stores may be configured as a single data store or multiple data stores.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
under control of one or more computing devices configured with executable instructions,
    receiving a private key encrypted with a security system public key associated with a security system;
    causing the storage of the encrypted private key in a plurality of computing resources of the security system;
    receiving from a client a request for the private key, the request including a blinding factor encrypted with the security system public key;
    providing the request for the private key and the blinding factor encrypted with the security system public key to the plurality of computing resources;

receiving from each of the plurality of computing resources, a partially decrypted product of the private key and the blinding factor;

combining each of the partially decrypted products received from each of the plurality of computing resources to decrypt a product of the private key and the blinding factor; and sending to the client the product of the private key and the blinding factor.

2. A method as recited in claim 1, wherein combining each of the partially decrypted products is performed using threshold cryptography.

3. A method as recited in claim 1, wherein the client is a subscriber to encrypted published data that can only be decrypted with the publication private key.

4. A method as recited in claim 1, wherein each of the plurality of computing resources use a respective security system private key share to partially decrypt the product of the blinding factor and the publication private key.

5. A method as recited in claim 1, wherein a security system private key is not stored at any of the computing resources.

6. A method as recited in claim 1, wherein the publication private key may be used to decrypt data published by a publisher and encrypted using a publication public key.

7. A method as recited in claim 1, wherein sending to the client the product of the private key and the blinding factor, includes:

prior to sending, encrypting the product of the private key and the blinding factor with a client public key.

8. A computing system, comprising:

one or more processors; and a memory coupled to the one or more processors and storing program instructions that when executed by the one or more processors cause the one or more processors to:

receive from a client a request for a private key, the request including a blinding factor encrypted with a security system public key;

provide the request for the private key and the blinding factor encrypted with the security system public key to a plurality of computing resources;

receive from each of the plurality of computing resources, a partially decrypted product of the private key and the blinding factor;

combine each of the partially decrypted products received from each of the plurality of computing resources to decrypt a product of the private key and the blinding factor; and send to the client the product of the private key.

9. The computing system of claim 8, wherein the program instructions that when executed by the one or more processors further cause the one or more processors to:

receive the private key encrypted with the security system public key associated with the security system; and cause a storage of the encrypted private key in the plurality of computing resources of the security system.

10. The computing system of claim 9, wherein each of the plurality of computing resources store a portion of the encrypted private key.

11. The computing system of claim 8, wherein each of the plurality of computing resources use a respective security system private key share to partially decrypt the product of the blinding factor and the publication private key.

12. The computing system of claim 8, wherein a security system private key is not stored at any of the computing resources.

13. The computing system of claim 8, wherein the publication private key may be used to decrypt data published by a publisher and encrypted using a publication public key.

14. The computing system of claim 8, wherein each of the partially decrypted products are combined using threshold cryptography.

15. The computing system of claim 8, wherein the client is a subscriber to encrypted published data that can only be decrypted with the publication private key.

16. A computer-implemented method for maintaining security, comprising:

under control of one or more computing systems configured with executable instructions, receiving from a subscriber a request for a publication private key;

notifying a plurality of computing resources of the request for the publication private key; and wherein the plurality of computing resources include executable instructions to perform the method, including:

multiplying an encrypted publication private key and a blinding factor to generate an encrypted product;

creating a partial decryption of the encrypted product; and providing the partial decryption of the encrypted product to a delegate.

17. The computer-implemented method of claim 16, wherein:

the delegate combines each of the partial decryptions of the encrypted product received from each of the computing resources to product a product; and the delegate provides the product to the subscriber.

18. The computer-implemented method of claim 16, wherein the blinding factor is provided by the subscriber.

19. The computer-implemented method of claim 18, further comprising providing a blinding factor to the plurality of computing resources.

20. The computer-implemented method of claim 16, wherein the product provided to the subscriber is used by the subscriber to obtain the publication private key.

* * * * *